(12) United States Patent  
Rehder et al.

(10) Patent No.: US 9,157,560 B2  
(45) Date of Patent: Oct. 13, 2015

(54) COUPLING ASSEMBLY

(71) Applicants: Randall J. Rehder, Oxnard, CA (US); Dodge H. Juhan, Thousand Oaks, CA (US)

(72) Inventors: Randall J. Rehder, Oxnard, CA (US); Dodge H. Juhan, Thousand Oaks, CA (US)

(73) Assignee: LinkTech Quick Couplings Incorporated, Ventura, CA (US)

( * ) Notice: Subject to any disclaimer, the term of this patent is extended or adjusted under 35 U.S.C. 154(b) by 242 days.

(21) Appl. No.: 13/967,691

(22) Filed: Aug. 15, 2013

(65) Prior Publication Data

US 2014/0103644 A1    Apr. 17, 2014

Related U.S. Application Data

(63) Continuation of application No. 13/316,663, filed on Dec. 12, 2011, now abandoned.

(51) Int. Cl.
    *F16L 37/086*     (2006.01)
    *F16L 37/084*     (2006.01)
    *F16L 37/32*      (2006.01)

(52) U.S. Cl.
    CPC ............. *F16L 37/0841* (2013.01); *F16L 37/32* (2013.01); *Y10T 29/49435* (2015.01); *Y10T 29/49826* (2015.01)

(58) Field of Classification Search
    CPC ................. F16L 37/0841; F16L 37/32; Y10T 29/49826; Y10T 29/49435
    USPC .................................. 285/282, 317, 320, 277
    See application file for complete search history.

(56) References Cited

U.S. PATENT DOCUMENTS

| | | |
|---|---|---|
| D42,368 S | 3/1912 | Mossberg |
| 2,935,338 A | 5/1960 | Mills, Jr. |
| 4,014,467 A | 3/1977 | Ferguson |
| 4,139,222 A | 2/1979 | Loland |
| 4,436,125 A | 3/1984 | Blenkush |
| 4,541,457 A | 9/1985 | Blenkush |
| 4,613,112 A | 9/1986 | Phlipot et al. |
| 4,863,201 A | 9/1989 | Carstens |
| 4,887,849 A | 12/1989 | Briet |
| 4,928,859 A | 5/1990 | Krahn et al. |
| 5,033,777 A | 7/1991 | Blenkush |
| 5,052,725 A | 10/1991 | Meyer et al. |
| 5,104,158 A | 4/1992 | Meyer et al. |
| 5,316,041 A | 5/1994 | Ramacier, Jr. et al. |
| 5,330,235 A | 7/1994 | Wagner et al. |
| 5,341,773 A | 8/1994 | Schulte et al. |
| 5,494,074 A | 2/1996 | Ramacier, Jr. et al. |
| 5,845,943 A | 12/1998 | Ramacier, Jr. et al. |
| 5,871,241 A | 2/1999 | Van Essen |
| 5,975,489 A | 11/1999 | deCler et al. |
| 6,112,855 A | 9/2000 | Camacho et al. |
| 6,682,106 B2 | 1/2004 | Parker |

(Continued)

OTHER PUBLICATIONS

Anonymous, Gra-Tec Product Catalog, Gra-Tech, Inc. (N.Y.), 156 N. Plymouth Ave., Rochester, N.Y. 14608 (1984).

(Continued)

*Primary Examiner* — David E Bochna

(57) ABSTRACT

A male coupling for attaching to a female coupling in which rotation of the male coupling with respect to the female coupling is limited. In one embodiment, the male coupling has one or more tabs extending from a flange, the tabs limiting rotation when the male coupling is mated to a female coupling assembly for fluid conductors

20 Claims, 26 Drawing Sheets

(56) References Cited

U.S. PATENT DOCUMENTS

| | | |
|---|---|---|
| 7,014,221 B2 | 3/2006 | Iwasaki et al. |
| 7,040,670 B2 | 5/2006 | Madden |
| 7,153,296 B2 | 12/2006 | Mitchell |
| 7,159,797 B1 | 1/2007 | Lammers |
| 7,387,318 B2 | 6/2008 | Yoshida |
| 7,401,820 B2 | 7/2008 | Niki |
| 7,434,842 B2 | 10/2008 | Schmidt |
| 7,434,844 B2 | 10/2008 | Kao |
| 7,534,067 B2 | 5/2009 | Chiodo |
| 7,562,906 B2 | 7/2009 | Schmidt |
| D612,021 S | 3/2010 | Schmidt |
| 7,695,020 B2 | 4/2010 | Schmidt |
| 7,708,320 B2 | 5/2010 | Binder et al. |
| 7,857,359 B2 | 12/2010 | Zeitlinger et al. |
| 2005/0012330 A1 | 1/2005 | Schmidt |
| 2008/0061553 A1 | 3/2008 | Schmidt |
| 2009/0284007 A1 | 11/2009 | Schmidt |

OTHER PUBLICATIONS

Anonymous, Colder Products Company Catalog, Colder Products Company, title page, p. 16, page showning printing date (1984).

Anonymous, Colder Products Company Catalog, Colder Products Company, title page, pp. 2, 45, (1989).

Anonymous, Gra-Tec Product Catalog, (1984) Gra-Tech, Inc. (N.Y.), 156 N. Plymouth Ave., Rochester, N.Y. 14608 (1984).

COUPLING ASSEMBLY

CROSS-REFERENCES TO RELATED APPLICATIONS

This application is a continuation of U.S. patent application Ser. No. 13/316,663, filed 12 Dec. 2011, which in turn, claims priority under 35 U.S.C. §119(e) to U.S. Provisional Application No. 61/421,821, filed 10 Dec. 2010, each foregoing application hereby incorporated by reference.

BACKGROUND OF THE INVENTION

1. Field of the Invention

This invention relates to couplings and, in particular, this invention relates to couplings for joining fluid conductors such as hoses.

2. Background

Male and female couplings are used to connect fluid conductors, such as hoses or lines conveying liquids or gases when the desired connection is nonpermanent. The female couplings may have a latch plate slidably disposed in a female coupling body. The latch plate contains an opening large enough to accommodate a portion of the male coupling. Accordingly, when the male coupling is mated to the female coupling, a portion of the male coupling is inserted into the female coupling, then locked in place by engaging an edge of the latch plate in a slot defined in the male coupling. To separate mated male and female couplings, the latch plate edge is disengaged from the male coupling slot and the male coupling is removed from within the female coupling. In many female coupling bodies, the latch plate is operably secured in place first by biasing the latch plate toward a locked position and second by extending a latch pin through an opening present in a lower portion of the latch plate.

The necessity of a separate opening to accommodate the latch pin, in turn, requires latch plates to be manufactured in a minimum size, which is incompatible with many existing female couplings. Additionally, it was believed that latch plates having intersecting openings, as described above, possessed insufficient strength for use and would detach if twisted.

In one type of failure, coupled male and female couplings can disconnect when a rotary and pulling force is exerted thereon. The cause for this type of failure is believed to be that the latch plate can catch a larger diameter on the slot of the mating male plug, thereby causing the male plug to "unthread" or causing the latch plate to displace from the larger diameter groove in the male plug due to the effect of the twisting and pulling forces.

Another type of failure in couplers of the prior art is believed to be caused by intersecting latch plate openings for the male plug and latch pin. Due to these intersecting openings, mated male and female couplers were believed to be more likely to disconnect if twisting and pulling forces were exerted on mated male and female couplings. Accordingly, a latch plate with separate openings for the latch pin and male plug was developed. While largely solving the problem of failed matings due to torsional forces, the latch plate was necessarily larger than latch plates with intersecting openings because of the minimum sizes of the two openings and minimum amount of latch plate material required between the openings. As a consequence of the larger latch plate, larger coupling bodies became necessary to accommodate the larger latch plates therewithin. The larger coupling bodies and latch plates required higher amounts of material, therefore were more expensive to manufacture. Moreover, the larger latch plates could not be used to retrofit many of the existing coupling designs, which were too small for the larger latch plates.

There is then a need for a female coupling which is resistant to being detached from a mated male plug and which is sufficiently small to allow retrofitting the latch plate to existing designs and dimensions.

By way of illustration and not limitation, the male couplings of the prior art may swivel freely when seated in the female couplings of this invention. While often a desirable feature, rotating freely when seated in a female coupling may induce undesirable consequences as well. One of these undesirable consequences is the increased likelihood of inadvertent disconnection due to torsional forces present during rotation. Additionally, free rotation may result in an undesirable non-uniform orientation of features such as latch plates on a row or array of seated male couplings. Non-uniform latch plates may also make it more difficult to remove or disconnect the male couplings. Accordingly and in some embodiments, it may be desirable to seat a male coupling into the female coupling of this invention, which will not swivel or rotate when seated.

SUMMARY OF THE INVENTION

The coupling of this invention includes a latch plate which combines the smaller sizes of latch plates which were easily detached from mated male plugs due to torsional forces and an ability to remain mated when undergoing torsional forces sufficient to separate couplings of the prior art.

Accordingly, there is provided a latch plate for a female coupling, the latch plate having first and second portions. The latch plate second portion extending from the latch plate first portion and having a first end proximate the first portion and a second end opposite the first end. The latch plate second portion may define a generally central first aperture and a second aperture, which may open into the first aperture. A portion of the first aperture may be bounded by a pair of lateral notches. Another portion of the first aperture may be defined by a pair of raised, radiused edges, each radiused edge bounded outboard by one of the notches and bounded inboard by an upper portion of the second aperture. The second aperture may have an upper portion opening into a lower portion, the lower portion having a lesser width than the width of the upper portion.

There is also provided a latch plate for a female coupling, the latch plate having first and second portions. The second portion may extend transversely from the first portion and may define a first generally central aperture and a second aperture opening into the first aperture and disposed oppositely to the first portion. The first aperture may have a lower edge flanked by a pair of outboard edges. A radius of each of the outboard edges greater may be greater than a radius of the lower edge.

There is further provided a female coupling assembly having a coupling body, a latch plate, and a latch pin. The coupling body defines a fluid pathway and a slot extending transversely to the fluid pathway. The latch plate may have a first portion and a second portion. The second portion may be slidably disposed in the slot and extend transversely from the first portion. The second portion may also define a first generally central aperture and a second aperture. The second aperture may open into the first aperture and may be disposed oppositely to the first portion. The first aperture may have a lower edge flanked by a pair of outboard edges, a radius of the outboard edges being greater than a radius of the lower edge. The latch pin may be secured in the coupling body. The latch pin may be at least partially disposed in the latch plate second aperture to limit vertical reciprocation of the latch plate.

There is still further provided a method of mating a male coupling to a female coupling. The male coupling may include a fluid pathway and a male coupler with a slot. The female coupling may have a coupling body, a latch plate, and a latch pin. The latch plate may have a generally central first aperture and a second aperture, which may open into the first aperture. The second aperture may be flanked by a pair of raised radial edges. The coupling body may define a generally central fluid pathway and a female coupling slot extending transversely to the fluid pathway. The latch plate may translate in the female coupling slot between a locked position and an unlocked position and may be biased toward the locked position. The latch pin may extend from the coupling body and may limit translation of the latch pin. The method may comprise translating the latch plate from the locked position to the unlocked position; inserting the male coupler into the fluid pathway of the female coupling body; and returning the latch plate to the locked position.

There is yet still further provided a method of manufacturing a female coupling assembly, wherein a planar portion of a latch plate is slidably disposed in a slot of a female coupling body. The female coupling body may further define a generally axial fluid pathway disposed transversely to the slot. The latch plate may have a first lever portion and a second planar portion. The second planar portion may define a generally central first aperture and a second aperture. The first aperture may be partially defined by pair of raised radial edges. The second aperture may open into the first aperture, such that an upper portion of the second aperture is bounded by the radial edges. The method may further include biasing the latch plate into a locked position and securing the latch plate in the slot.

Figure 1:
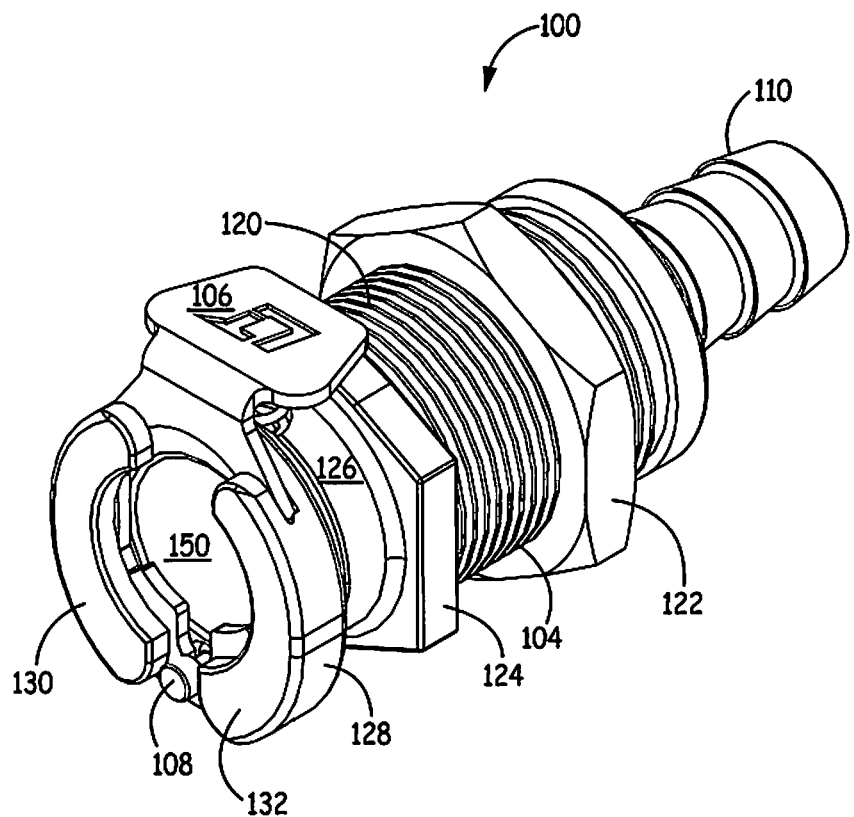
FIG. 1 is a perspective view of one embodiment of the female coupling assembly of this invention.
Figure 2:
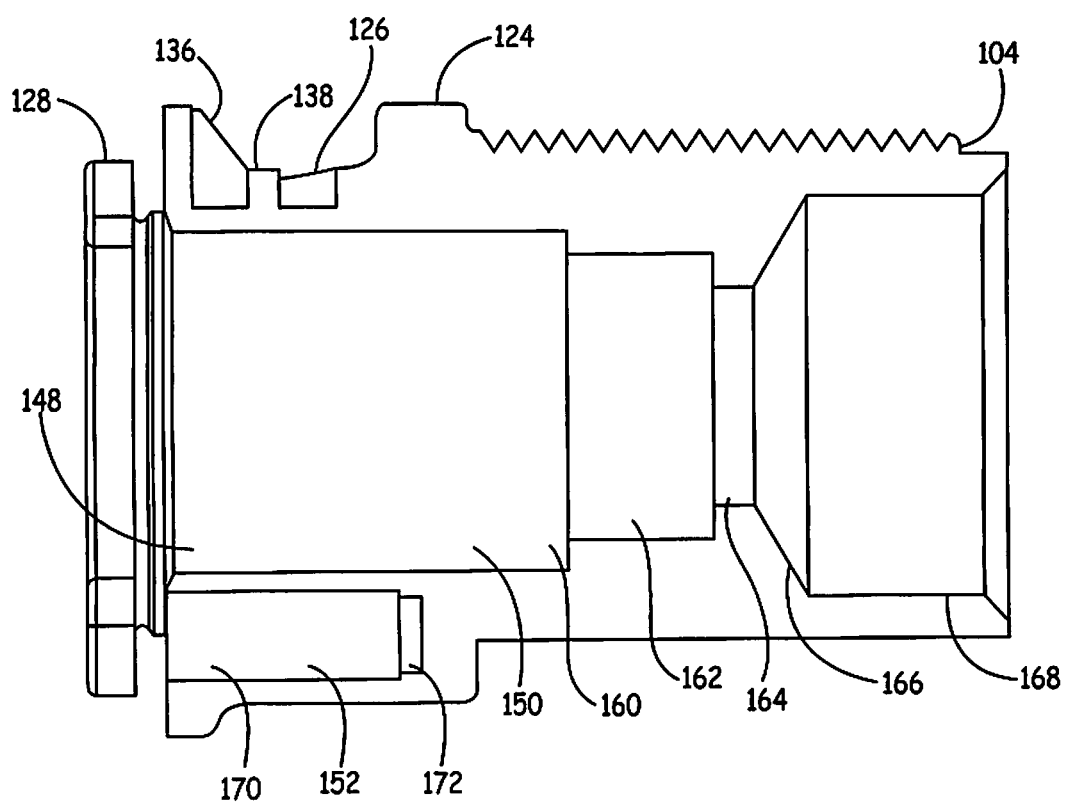
FIG. 2 is a cross-sectional view of the coupling body of the female coupling assembly of FIG. 1.
Figure 3:
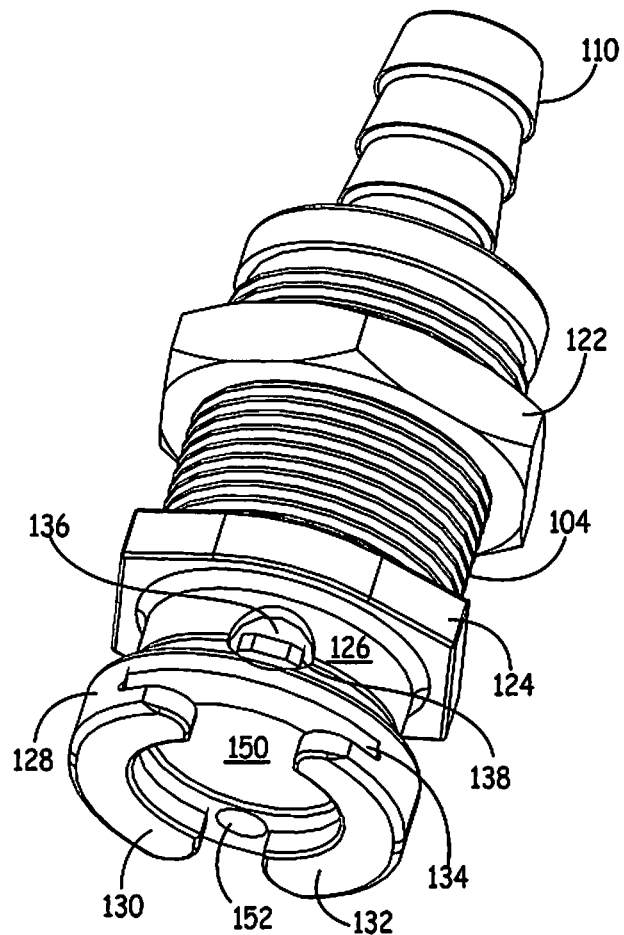
FIG. 3 is a top view of the coupling body of FIG. 2.
Figure 4:
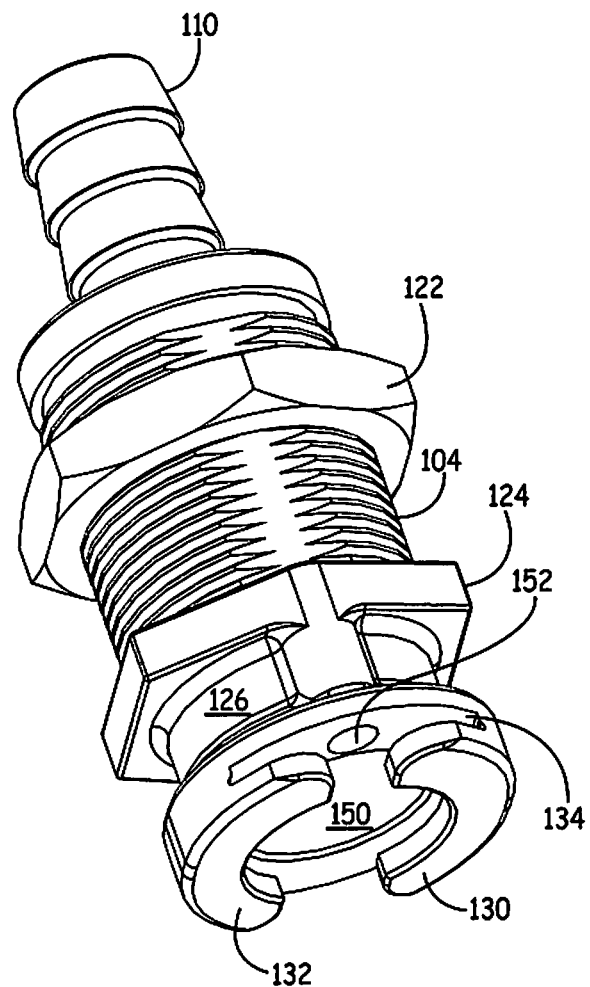
FIG. 4 is a bottom view of the coupling body of FIG. 2.

Other drawings without designation as Figures are included to further illustrate embodiments of the invention.

It is understood that the above-described figures are only illustrative of the present invention and are not contemplated to limit the scope thereof.

DETAILED DESCRIPTION

Any references to such relative terms as upper and lower, horizontal and vertical, or the like, are intended for convenience of description and are not intended to limit the present invention or its components to any one positional or spatial orientation. All dimensions of the components in the attached figures may vary with a potential design and the intended use of an embodiment of the invention without departing from the scope of the invention.

Each of the features and methods disclosed herein may be utilized separately or in conjunction with other features and methods to provide improved devices of this invention and methods for making and using the same. Representative examples of the teachings of the present invention, which examples utilize many of these additional features and methods in conjunction, will now be described in detail with reference to the drawings. This detailed description is merely intended to teach a person of skill in the art further details for practicing preferred aspects of the present teachings and is not intended to limit the scope of the invention. Therefore, combinations of features and methods disclosed in the following detailed description may not be necessary to practice the invention in the broadest sense, and are instead taught merely to particularly describe representative and preferred embodiments of the invention. A person of ordinary skill in the art will readily appreciate that individual components shown on various embodiments of the present invention are interchangeable to some extent and may be axially interchanged on other embodiments without departing from the spirit and scope of this invention.

One embodiment of a female coupling assembly of this invention is depicted in FIGS. 1-4 at 100 and includes a coupling body 104, a latch plate 106, a latch pin 108, and an optional socket 110. The coupling body 104 may be unitary, or otherwise integral, such as when formed by injection molding. The surface of the coupling body 104 defines external threads 120 in the embodiment depicted. The threads 120 may accommodate a nut 122. A flange 124 axially adjoins the threads 120. From the flange 124 the coupling body narrows into a neck 126. From the neck 126, the coupling body 104 flares into an extension 128, the extension 128 forming a pair of faces 130, 132 and a slot 134. A well 136 extends from an upper surface of the neck 126, a keep 138 being present within the well 136. The keep 136 represents a raised area, wherein a spring, or other biasing means, may be anchored to the coupling body 104, the spring more fully explained infra.

The interior of the coupling body 104 defines a fluid pathway 148, such as embodied by a generally central bore 150 and further defines a latch pin bore 152. The latch pin bore 152 is disposed radially and outwardly from the central bore 150 and generally opposite the well 136. The central bore 150, in turn, may be considered to include respective first, second, third, flared, and fourth portions 160, 162, 164, 166, 168. The first, second, and third portions have stepped, decreasing diameters. The central bore 150 then continues at the flared portion 166 from the third portion 164 to the fourth portion, which has a considerably larger diameter than the third portion 164 in this embodiment. A first portion 170 of the latch pin aperture 152 opens into a second portion 172, the second portion 172 having a smaller diameter than the first portion 170. However, a person of ordinary skill in the art will readily recognize that other configurations and locations for the central bore and/or latch pin aperture of this invention may be desirable for other embodiments.

Figure 5:
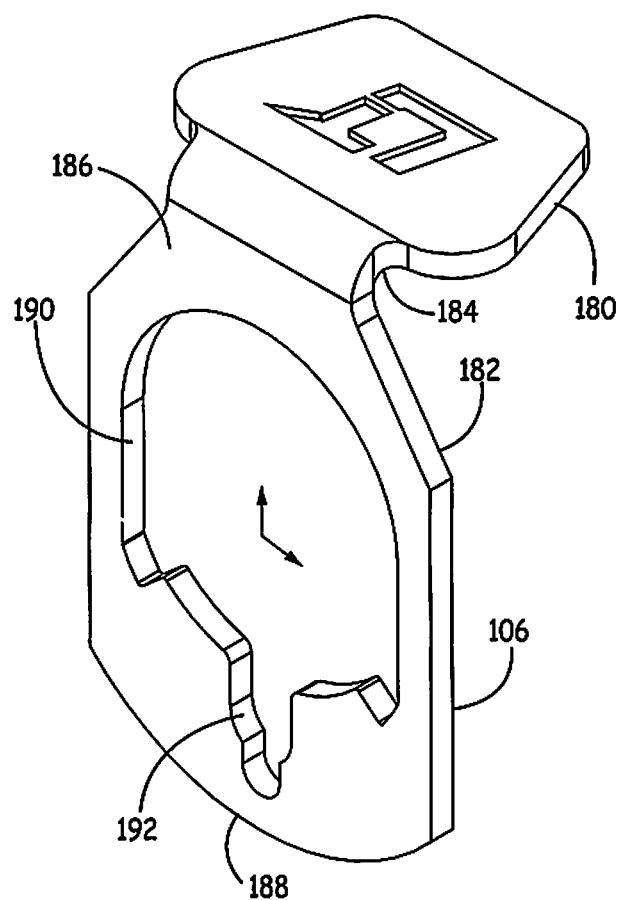
FIG. 5 is a perspective view of a latch plate of this invention.
Figure 6:
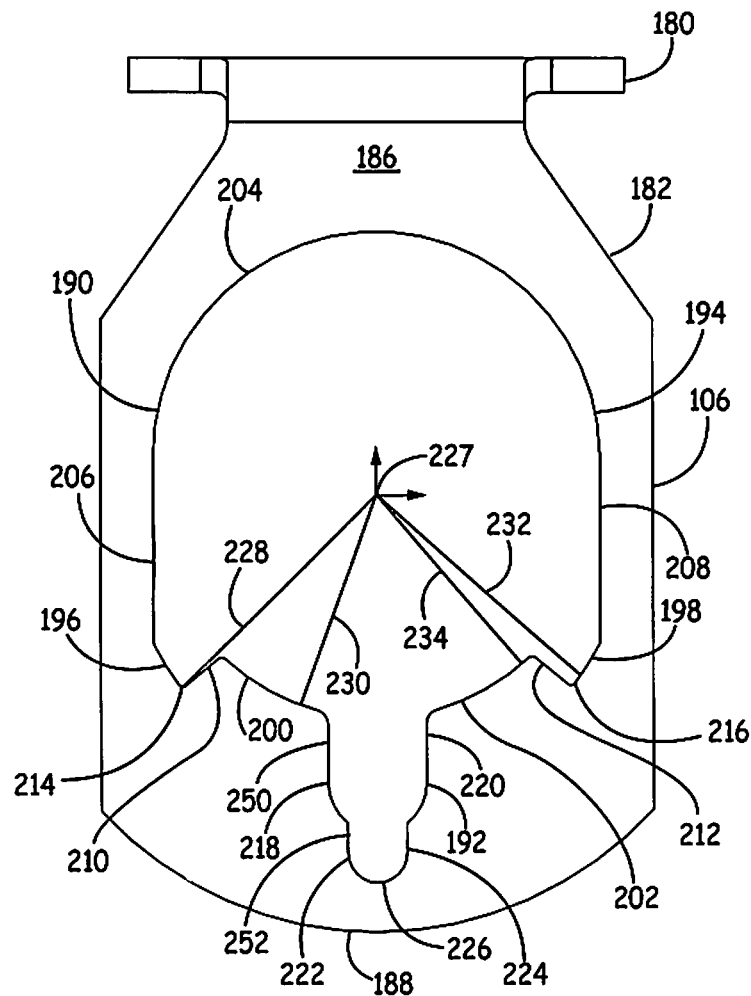
FIG. 6 is a front view of the latch plate of FIG. 5.

Referring to FIGS. 5-6, the unitary or otherwise integral latch plate 106 of this invention includes a first lever portion 180 and a second planar portion 182 joined at a bend 184. The second planar portion 182 may be considered to have a top 186 and a bottom 188. Defined in the second planar portion 182 are upper first and lower second apertures 190, 192, the second aperture 192 opening into the first aperture 190. The first aperture 190 is defined by an upper edge 194, first lateral edges 196, 198, and raised radial edges 200, 202. The upper edge 194, in the embodiment depicted, has a generally arcuate upper portion 204 proximate the top 186 and linear lower portions 206, 208 depending from the upper portion 204. The first lateral edges 196, 198 extend between the linear lower portions 206, 208 and respective second lateral edges 210, 212. Paired first lateral edge 196 and second lateral edge 210 and paired first lateral edge 198 and second lateral edge 212 define respective notches 214, 216. The raised radial edges 200, 202 extend between respective upper edges 218, 220 of the lower second aperture 192 and second lateral edges 210, 212 or between upper edges 218, 220 and notches 214, 216. The second aperture upper edges 218, 220, in turn, arcuately adjoin respective lower edges 222, 224. The lower edges 222, 224 extend from an arcuate terminal edge 226. The raised edges 200, 202 are arcuate in the embodiment depicted and, by forming notches 214, 216, are each disposed at a lesser radial distance from the center 227 of the upper first aperture 190. The lesser radial distance may be described by paired first and second radial distances 228, 230 and by paired first and second radial distances 232, 234, wherein the second radial distances 230, 234 are less than the first radial distances 228, 232. Regarding the lower second aperture 192, the distance between the upper edges 218, 220 is larger than the distance between the lower edges 222, 224.

Figure 7:
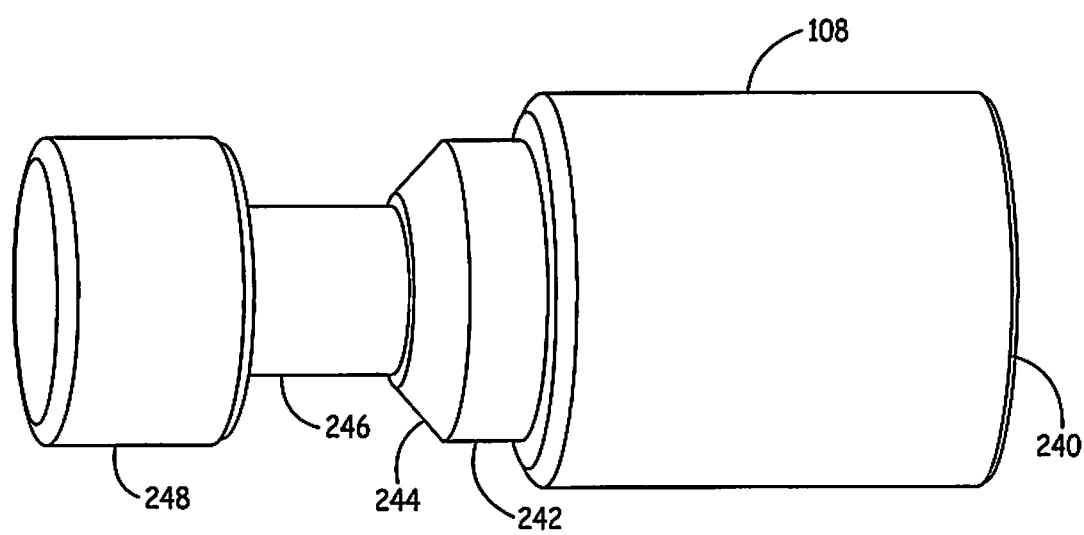
FIG. 7 is a side view of a latch pin of this invention.

Referring to FIG. 7 the latch pin 108 is unitary, or otherwise integral, in the embodiment depicted, but may be considered to include a base 240, a collar 242 adjoining the base 240, a transition 244 extending between the collar 242 and a neck 246. The neck 246 adjoins a terminus 248. The base 240 is accommodated within the first portion 170 of the latch pin radial aperture 152 such that the latch pin 108 can reciprocate therewithin. The neck 246 is dimensioned to be accommodated between both upper edges 218, 220 and between both lower edges 222, 224, the upper edges 218, 220 and lower edges 222, 224 laterally defining respective upper and lower portions 250, 252 of the lower second aperture 192. The terminus 248, with a larger radius then the neck 246, is accommodated between the upper edges 218, 220, but will not pass between the lower edges 222, 224.

Figure 8:
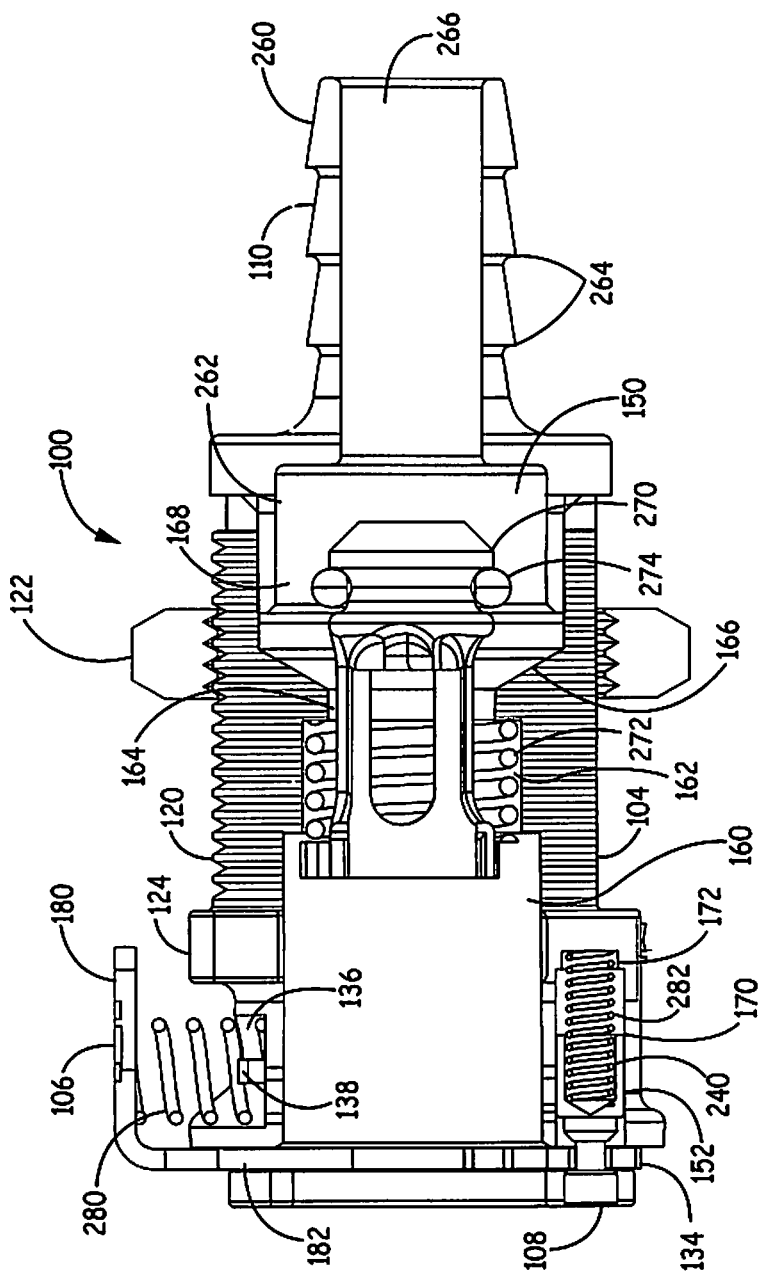
FIG. 8 is a cross-sectional view of the female coupling assembly of FIG. 1.

As seen in FIG. 8, the socket 110 has an attachment portion 260 and an insertion portion or plug 262. The insertion portion 262 may be snugly accommodated by the fourth portion 168 of the coupling body central bore 152 thereby achieve a fluid-tight friction fit therewithin. A plurality of ribs 264 may be present about the circumference of the attachment portion 260. A fluid pathway 266 is defined within the socket 110, the fluid pathway 266 opening into the fluid pathway 148 defined within the coupling body 104.

In the embodiment shown in FIG. 8, a valve 270 is present in the coupling body central bore 150, the valve biased toward a locked position by a spring 272. The spring 272 is disposed within the second portion 162 of the coupling body central bore 150. A base of the valve 270 is disposed in first portion 160 of the coupling body central bore 150 proximate the second portion 162. The remainder of the valve 270 extends within the spring 272 to occupy the second portion 162, through the third portion 164 and flared portion 166 and occupies an inboard portion of the fourth portion 168 of the coupling body central bore 150. An O-ring 274 seals the valve 270 against an inboard surface of the fourth portion 168. A spring 280, or other biasing means, biases the latch plate 106 in a locked position, the spring 280 exerting a force against a lower surface of the latch plate first lever portion 180, a lower portion of the spring secured by being disposed within the well 136 and about the keep 138. The latch plate second planar portion 182 is slidably disposed in the slot 134.

Figure 9:
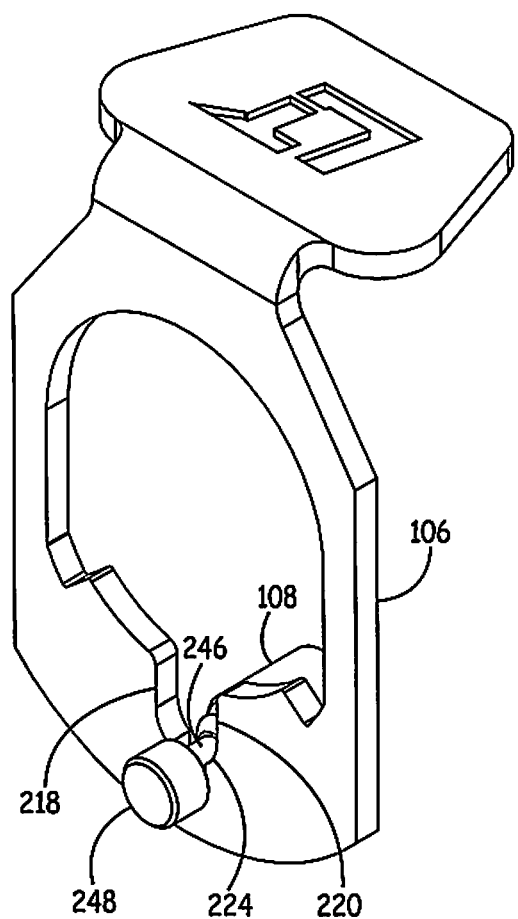
FIG. 9 is a perspective view of the latch pin of FIG. 7 mated to the latch plate of FIGS. 5 and 6.
Figure 10:
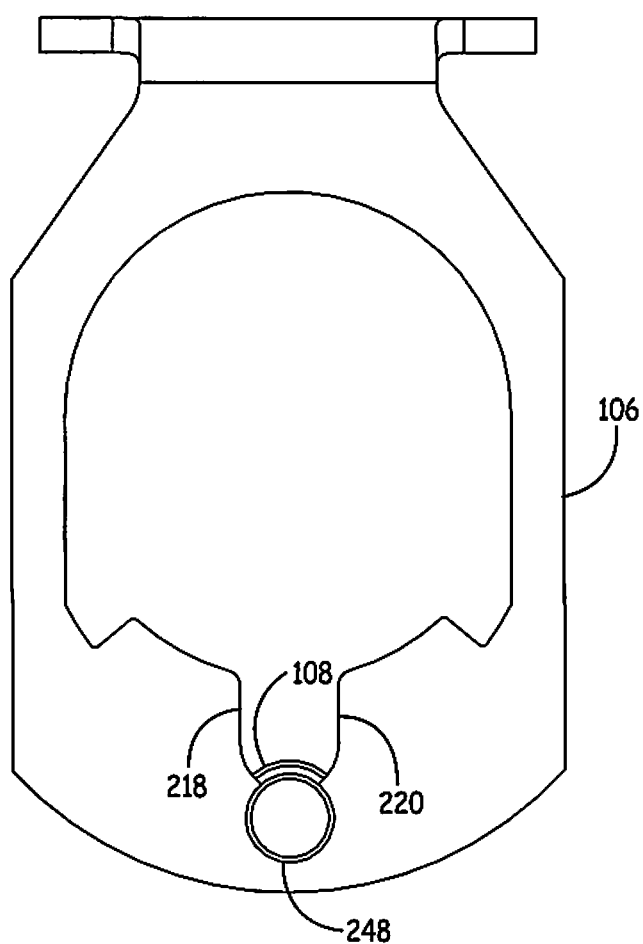
FIG. 10 is a front view of the latch pin of FIG. 7 mated to the latch plate of FIGS. 5 and 6.

As seen in FIGS. 8, 9, and 10, the latch plate 106 can be reciprocated within the slot 134, upper movement of the latch plate 106 limited by the latch pin 108 and lower movement of the latch plate 106 limited when the latch plate first lever portion 180 contacts the coupling body 104. Upper movement of the latch plate 106 is limited by the insertion of the latch pin neck 246 in the lower portion 252 of the second aperture 192. Because the diameter of the latch pin terminus 248 is larger than the distance between the lower edges 222, 224, the latch pin 108, disposed within the latch pin radio aperture 152, limits upper movement of the latch plate 106. A spring 282, or other biasing means, biases the latch pin 108 toward an outboard position, wherein the latch pin neck and terminus engage the latch plate as described above. A base of the spring 282 is secured in the second portion 172 of the latch pin radial aperture at 152, the second portion 172 having a smaller diameter than the latch pin radial aperture first portion 170.

Figure 11:
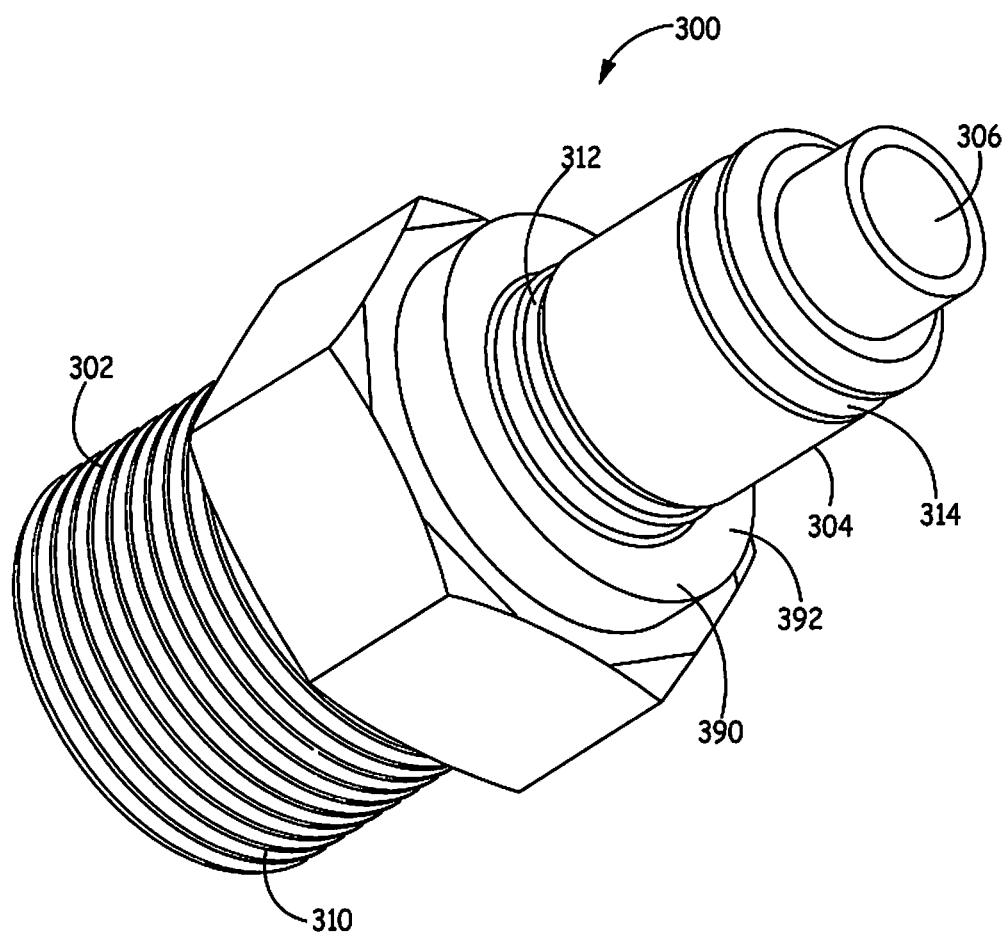
FIG. 11 is a perspective view of a male coupling suitable for use with the female coupling assembly of this invention.
Figure 12:
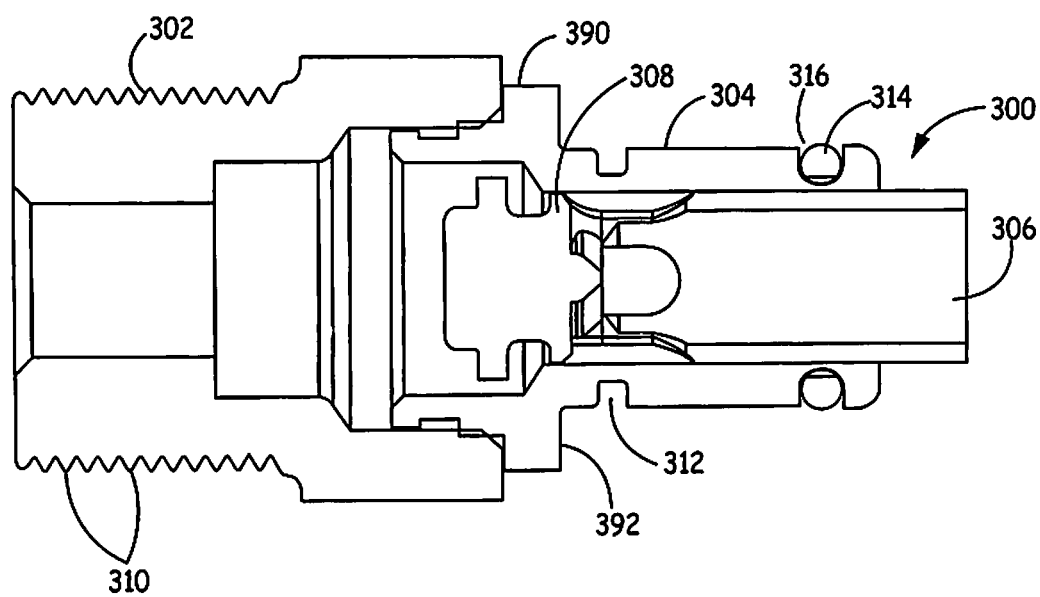
FIG. 12 is a cross-sectional view of the male coupling of FIG. 11.

As shown in FIGS. 11 and 12, one embodiment of a male coupling 300 has a connector 302, a coupler or plug 304 and a valve 308 operably disposed within a fluid pathway 306. A plurality of threads 310 are formed on the exterior of the connector 302; however, other connecting means such as ribs could also be present. A medial slot 312 is formed about the coupler 304 and an O-ring 314 is present in a terminal slot 316 proximate the tip of the coupler 304.

Figure 13:
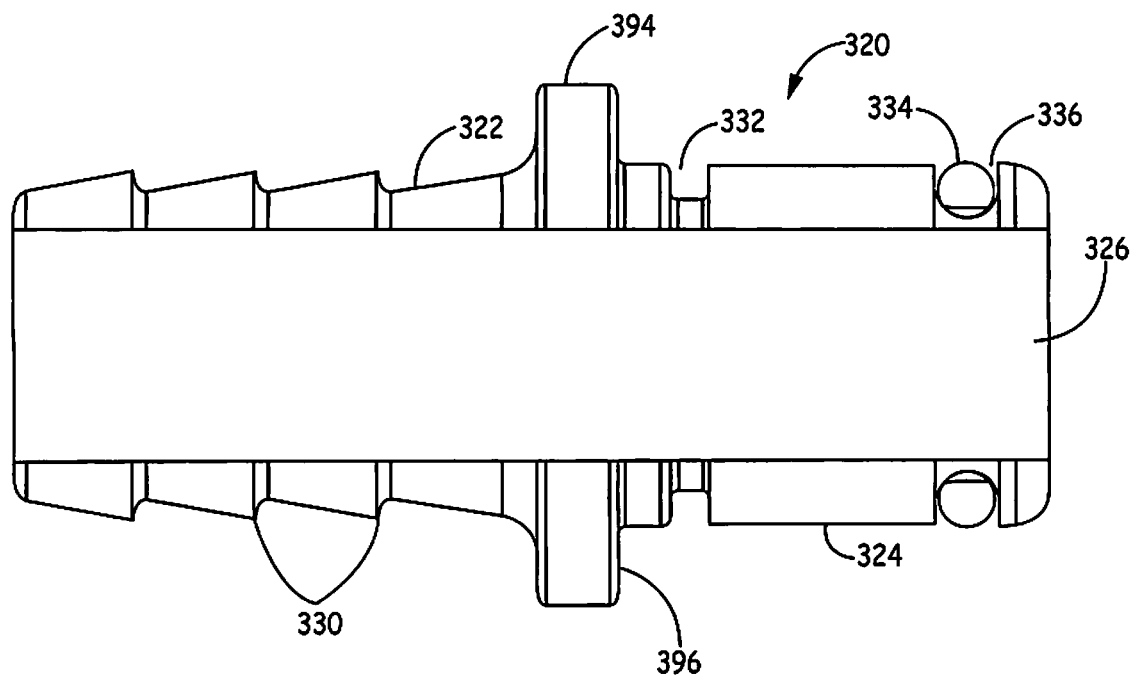
FIG. 13 is a cross-sectional view of another male coupling suitable for use with the female coupling assembly of this invention.
Figure 14:
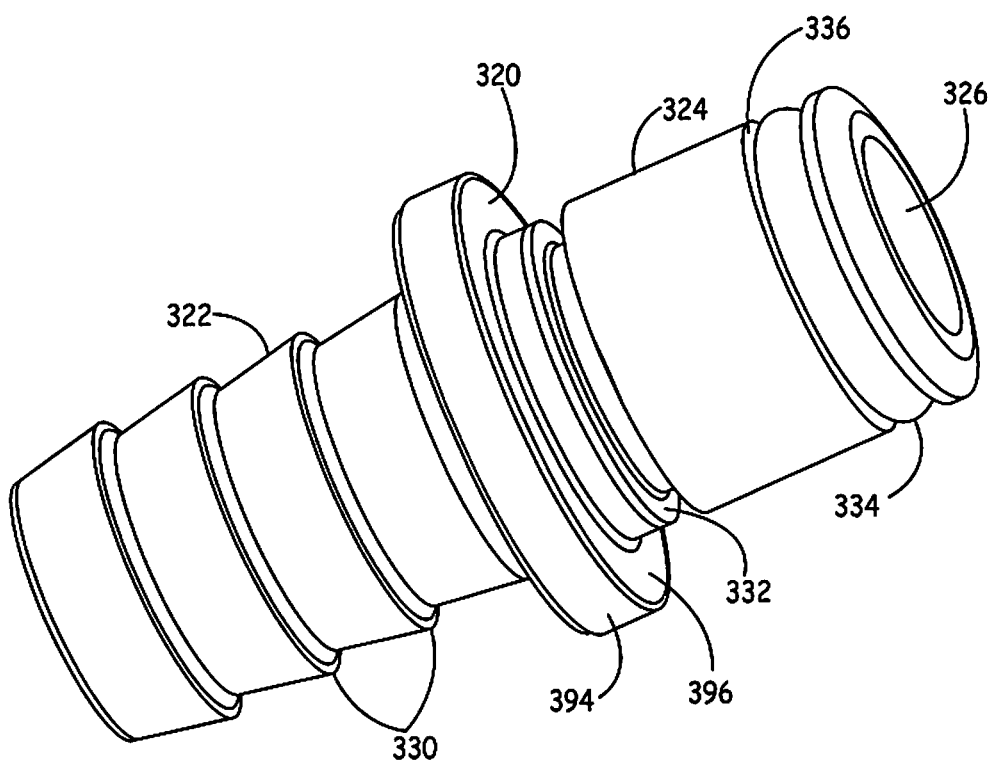
FIG. 14 is a perspective view of the male coupling of FIG. 13.

FIGS. 13 and 14 depict another embodiment of a male coupling suitable for being mated with the female coupling assembly of this invention, the male coupling shown generally at 320. The male coupling 320 has a connector 322 and a coupler or plug 324 and defines a fluid pathway 326 therethrough. A plurality of ribs 330 are disposed on the exterior surface of the connector 322. A medial slot 332 is defined about the coupler 324 and an O-ring 334 is disposed within a terminal slot 336.

Figure 15:
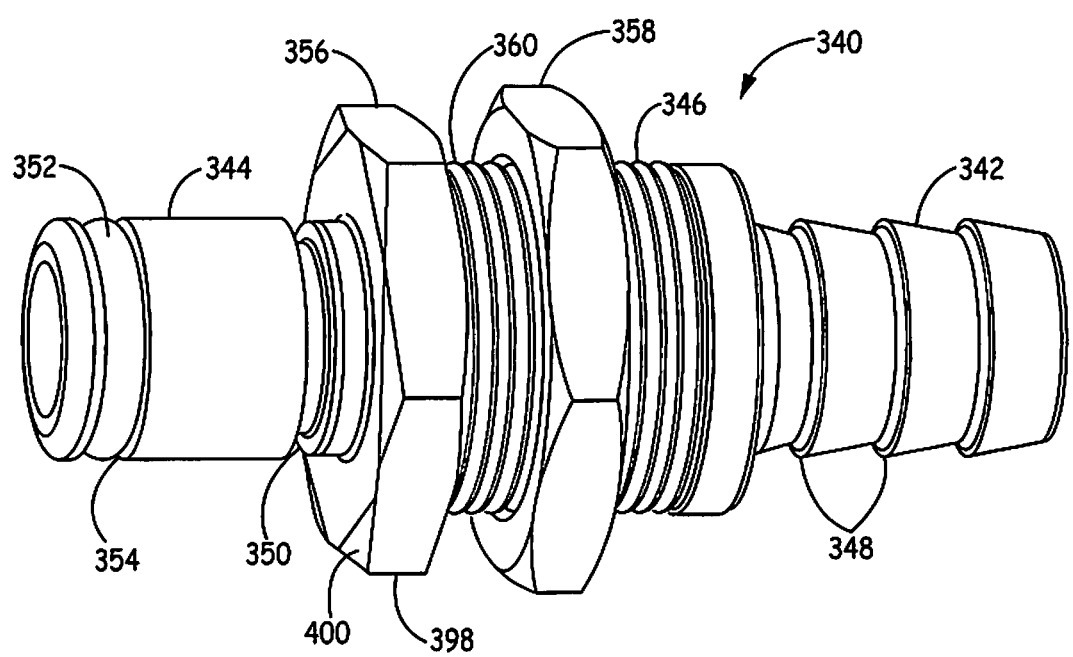
FIG. 15 is a perspective view of yet another male coupling suitable for use with the female coupling assembly of this invention.

Referring to FIG. 15, a male coupling 340, suitable for attaching to a panel, includes a connector 342, a coupler or plug 344, and panel attachment 346. A plurality of ribs 348 are disposed about the exterior of the connector 342. A medial slot 350 is formed about the coupler 344 and an O-ring 352 is disposed within a terminal slot 354. In the embodiment shown, the panel attachment 346 has nuts 356, 358 rotatably disposed about, and accommodated by, threads 360. When being attached to a panel, one of the nuts 356, 358 is removed and the male coupling 340 is disposed through an opening in the panel. The male coupling 340 is secured in place by reattaching the nut 356 or 358 such that a portion of the panel is securely retained between the nuts 356, 358.

Figure 16:
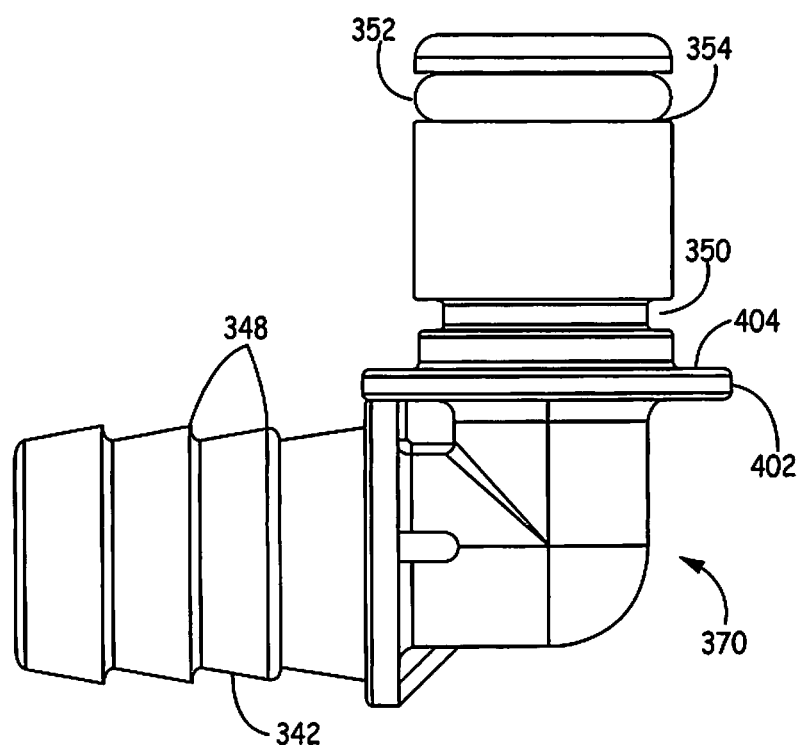
FIG. 16 is a perspective view of still another male coupling suitable for use with the female coupling assembly of this invention.

FIG. 16 depicts a male coupling 370, which differs from the male coupling 340 (shown in FIG. 14) by the presence of an elbow with a ninety degree change in flow. However, other elbows, such as forty-five degrees, are within the spirit and scope of this invention as well.

Figure 17:
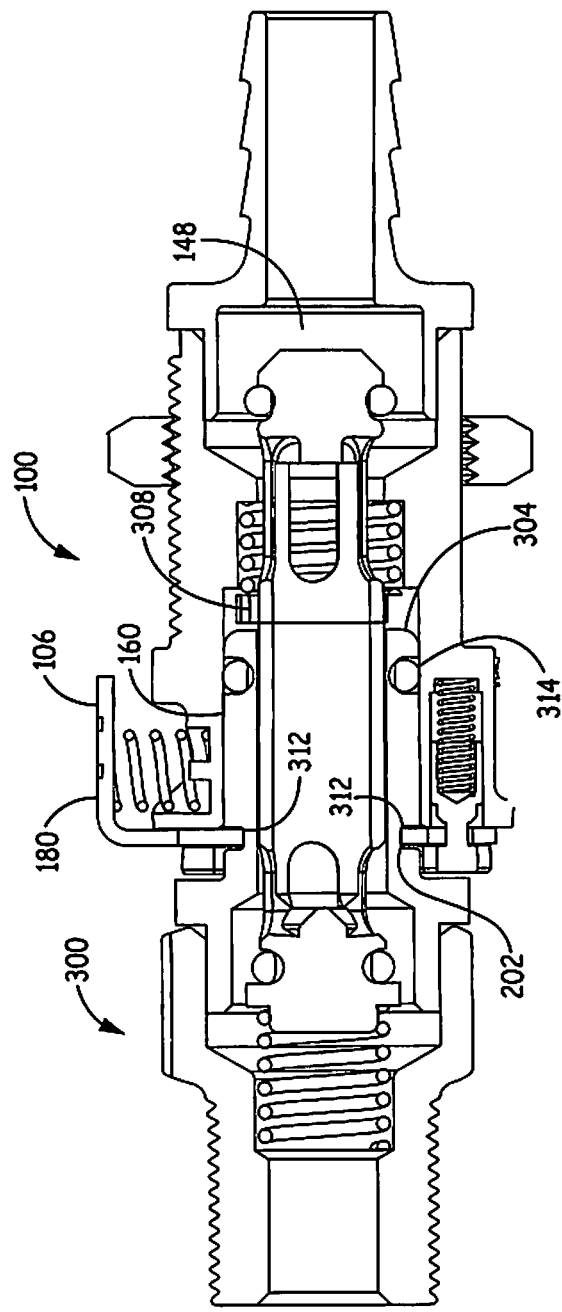
FIG. 17 is a cross-sectional view of a female coupling assembly of this invention mated to a male coupling.

FIG. 17 depicts the female coupling assembly 100 mated to a male coupling 300. When mated thusly, the coupler 304 is disposed within the coupling body central bore first portion 160 abutting the valve 308 and axially displacing the valve 308 to thereby open up the fluid pathway 148 for fluid flow. The male coupling 300 is secured within the female coupling assembly 100 when the raised radial edges 200, 202 are disposed within the medial slot 312 and when the latch plate 106 is in the locked position. In other embodiments, the raised radial edges 200, 202 would be disposed within one of the medial slots 332, 350. The male coupling is removed by depressing the latch plate lever portion 180 to remove the raised radial edges from the medial slot 312 when the latch plate is in an unlocked position.

The belief widely held in the prior art with respect to torsional separation of mated couplings due to twisting and pulling forces (termed "cam out") was first that latch plates lacking separate openings for male couplings and for latch pins without the requisite rigidity and resistance to bending. Accordingly, the prior art believed that the inherent flexibility of latch plates made them more susceptible to undesired cam out. Another widely held belief was that edges defining the pin apertures of prior art latch plates contacted and entered male coupling slots, thereby disengaging the slots from intended edges on the latch plates, ultimately disengaging the male couplings from the female couplings to cause cam out. Yet another widely held belief in the prior art was that a maximum amount of edge positioned to contact and dispose within the male coupling slot—especially at outboard portions of the central aperture—was necessary to prevent cam out.

Notwithstanding the above-described widely held beliefs in the prior art, the inventors of the present latch plate and female coupling have discovered that cam out occurs when male plugs mated to female latch plates are rotated and twisted such that the edges intended to dispose within the male plug slots are forced out of these slots due to the resulting twisting and lack of axial alignment (tilting) on the part of the male plugs. Accordingly, the two raised radial edges, being sloped toward each other and an increased depth for more effective penetration within the male plug slot, effectively prevent cam out when torsion and pulling forces are exerted on the mated male and female couplings because of the depth in which the raised radial edges penetrate the medial slots Additionally, the inventors have found that the presence of the notches 214, 216 removes edges that would otherwise cause cam out due to the torque resulting from torsional and pulling forces.

Figure 18:
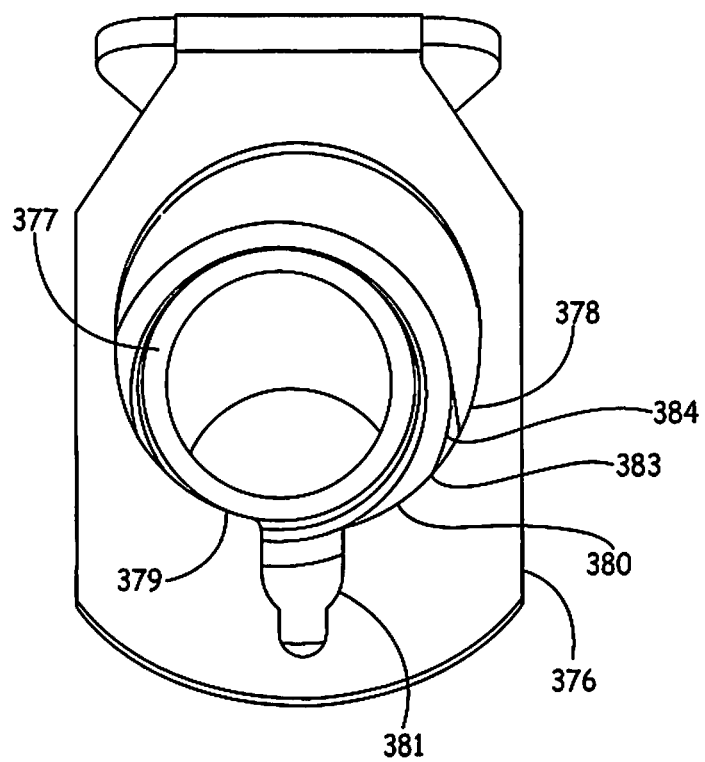
FIG. 18 is a cross-sectional view of a latch plate and male coupling of the prior art wherein the male coupling is out of axial alignment.
Figure 19:
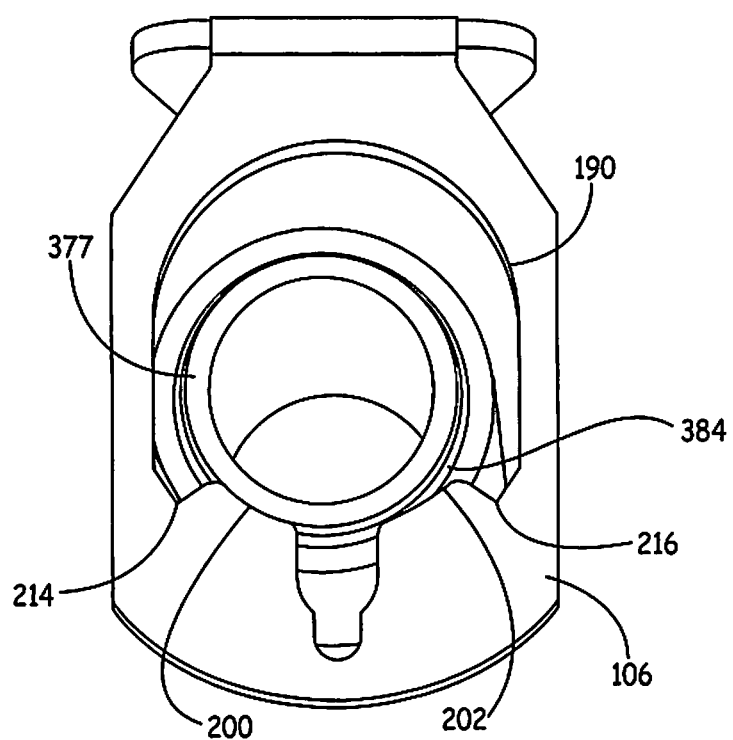
FIG. 19 is a cross-sectional view of a latch plate and male coupling of this invention wherein the male coupling is out of axial alignment.

As shown in FIG. 18, a cross section of a latch plate 376 and male coupling plug 377 of the prior art are shown. A first central aperture 378 defined in the latch plate 376 is partially bounded by lower edges 379, 380. A second latch pin aperture 381 opens into the first central aperture 378, such that the opening is flanked by lower edges 379, 380. In this prior art embodiment, the first central aperture 378 is not bounded by a raised radial edge or notches. As shown in FIG. 18, the male plug 377 is out of axial alignment due to being torsional and pulling forces such that the male plug 377 contacts the lower edge 379, rather than both edges 379, 380. Consequently a low angle of impingement 383 between the lower edge 380 and an exterior surface 384 of the plug 377. The lower angle of impingement 383 enables the lower edge 380 to catch or become partially embedded into the plug 377 to thereby exert a downward force against the latch plate spring (not shown), ultimately translating the latch plate into an unlocked position and forcing the plug 377 out of the central opening. This cam out phenomenon is similar to events and forces occurring when a derailleur changes front sprockets in a multi-sprocket (for example, 10 speed) bicycle. By contrast and as seen in FIG. 19, an angle of impingement does exist between the raised radial edge 202 and male plug exterior surface 384. Consequently, the radial edge 202 cannot be partially embedded in the exterior surface 384 of the plug 377, when the plug 377 is out of axial alignment (as shown in FIG. 19). Thus, cam out is less likely to occur with respect to the latch plate of this invention.

In contrast to latch plates of, and widely held beliefs present within, the prior art, which have separate openings for the latch pin and fluid pathway, the inventors have found that the present latch plate possesses the requisite strength. It was previously believed that the presence of raised radial edges in the central opening necessitated a separate opening for the latch pin because the latch plate would otherwise lack the requisite strength and the mated male coupling would become detached if a twisting or torsion force were to be exerted on either of the mated male or female couplings. However, the inventors have found that if the opening for the latch pin opens into the central opening, the latch plate will have sufficient strength to secure the mated couplings. Moreover, the mated couplings will be less likely to separate if twisted. Additionally, the presence of the intersecting openings allows for a smaller vertical dimension of the latch plate. Consequently, the latch plate can be used to retrofit couplings with smaller sizes than many of the latch plates of the prior art. Finally, due to the intersecting openings, the latch plates of this invention can be manufactured using lower tolerances. Consequently, the latch plates of this invention are believed to be less expensive to manufacture than those of the prior art.

A person of ordinary skill in the art will readily recognize that any of the couplings depicted herein may be suitable for use either with or without a valve operably present in the fluid pathway defined therewithin.

Embodiments of the coupling body of this invention may be formed from chrome-plated brass or synthetic resins, such as acetal copolymer. However, a person of ordinary skill in the art will readily recognize that other synthetic resins may be suitable for a given embodiment of this invention. The latch plates of this invention may be formed from stainless steel or a synthetic resin such as acetal copolymer. Other suitable synthetic resins may be found in the Handbook of Plastics, Elastomers, and Composites, Charles A. Harper, Editor in Chief, Third Edition, McGraw-Hill, New York, 1996, hereby incorporated by reference. As stated supra, the coupling body, latch pin, and socket of this invention may be made by injection molding. If made from synthetic resin, the latch plate of this invention can be formed by injection molding. If made from a metal, such as stainless steel, the present latch plate, coupling body, and/or latch pin of this invention may be made by stamping, as well as by water jet, laser cutting, die casting, metal injection molding, forging or equivalent methods.

Referring to FIGS. 11-12, the male coupling 300 may include a radial extension, such as a flange 390, with a face or abutting surface 392, the surface 392 abutting the faces 130, 132 of the female coupling 100 (FIG. 1) in the embodiments depicted when the male couplings of this invention are seated in the female coupling 100. The male coupling 320, as depicted in FIGS. 13-14, may include a corresponding flange 394 and an abutting surface 396 abutting the female faces 130, 132 when the male coupling 320 is seated in the female coupling of this invention. Referring now to FIG. 15, the nut 356 may be unitary, or otherwise integral, to the body of the male coupling 340 and may thusly be considered to be a flange 398 with an abutting surface 400 having a similar function to the flanges 390, 394, 398 and surfaces 392, 396, 400 described previously. The male coupling 370 depicted in FIG. 16 may include a flange 402 with an abutting surface 404. The flange 402 and surface 404 may be functionally similar to the flanges 390, 394, 398, and surfaces 392, 396, 400.

Figure 20:
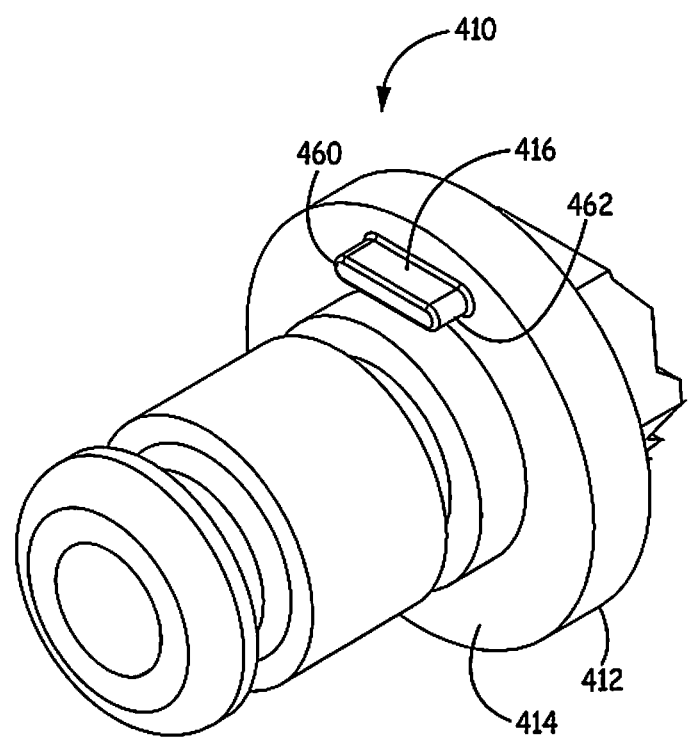
FIG. 20 is a perspective view of a portion of one embodiment of a male coupling of this invention.

FIG. 20 depicts a male coupling 410 having a flange 412 with an abutting surface 414. A non-rotational feature, such as a horizontal tab 416, extends unitarily, or otherwise integrally, from the abutting surface 414. In cross-section the tab 416 has a generally rectangular geometry with rounded terminal or lateral edges.

Figure 21:
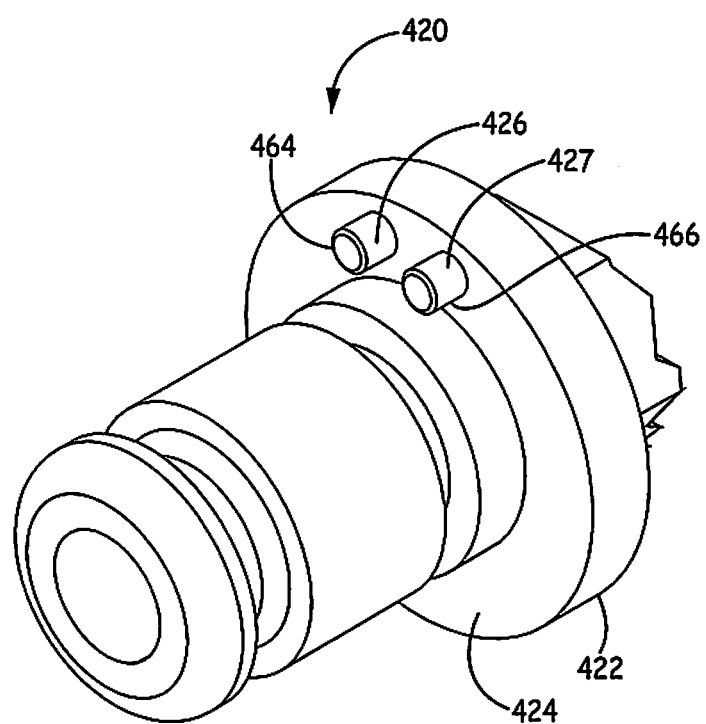
FIG. 21 is a perspective view of a portion of another embodiment of a male coupling of this invention.

FIG. 21 shows a male coupling 420 with a flange 422 and abutting surface 424. Extending from the surface 424 are tabs 426, 427, which have a generally cylindrical geometry in the embodiment depicted.

Figure 22:
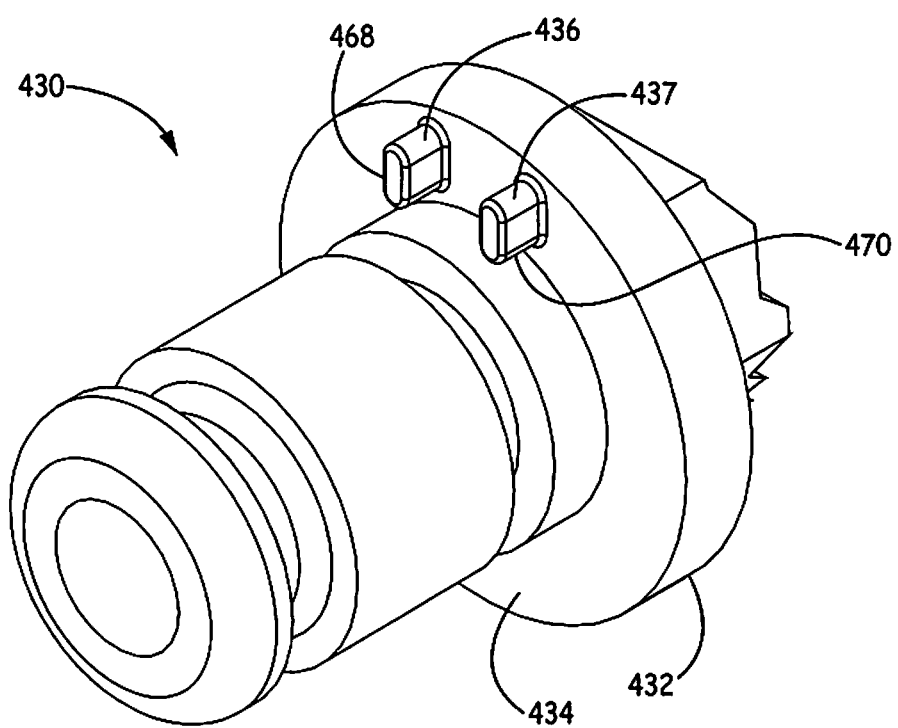
FIG. 22 is a perspective view of a portion of yet another embodiment of a male coupling of this invention.

Male coupling 430 is shown in FIG. 22 and has a flange 432 and abutting surface 434. A pair of aligning tabs 436, 437 extend unitarily, or otherwise integrally, from the surface 434 in this embodiment. The tabs 436 and 437 are generally rectangular in cross-sectional geometry with rounded upper and lower edges.

Figure 23:
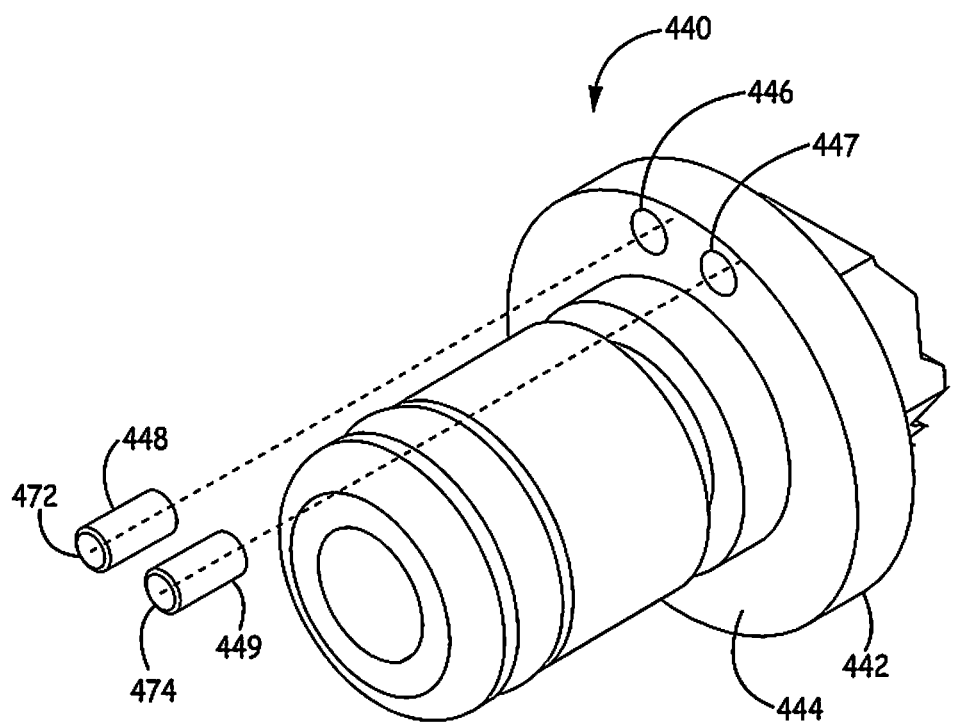
FIG. 23 is an exploded view of a portion of still another embodiment of a male coupling of this invention.
Figure 24:
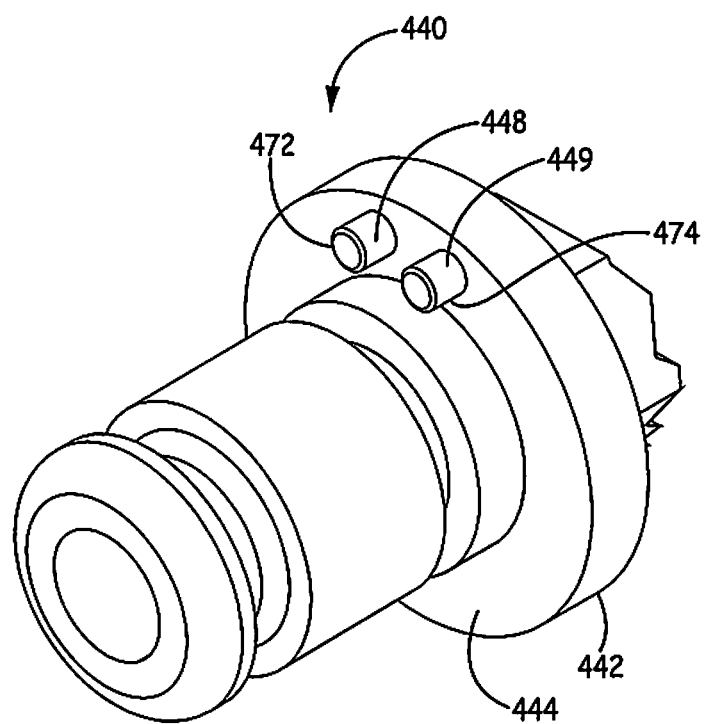
FIG. 24 is a perspective view of the male coupling of FIG. 23.

As shown in FIGS. 23, 24, a male coupling 440 has a flange 442 with an abutting surface 444 and bores 446, 447 formed in the flange 442 and extending from the abutting surface 444. Inserts, such as tabs 448, 449 may be disposable within the bores 446, 447, as illustrated in FIG. 23.

The male couplings 410, 420, 430, 440 may be made from Delrin acetyl (DuPont) or another suitable synthetic resin, such as disclosed and described in the Handbook of Plastics, Elastomers and Composites, Charles A. Harper, Editor-In-Chief, Third Edition, McGraw-Hill, New York, 1996. Methods of manufacturing male couplings 410, 420, 430, 440 include injection molding or equivalents known to the art. The male coupling 440 may also be formed, for example, by machining chrome/brass, another suitable metal, or a synthetic resin known to the art, such as used to manufacture the male couplings 410, 420, 430.

Lateral or outboard contact surfaces may be present on the tabs of the male couplings 410, 420, 430 such as shown at 460, 462 for male coupling 410 in FIG. 20, at 464, 466 for male coupling 420 in FIG. 21, at 468, 470 for male coupling 430 in FIG. 22, and at 472, 474 for male coupling 440 in FIGS. 23, 24.

Figure 25:
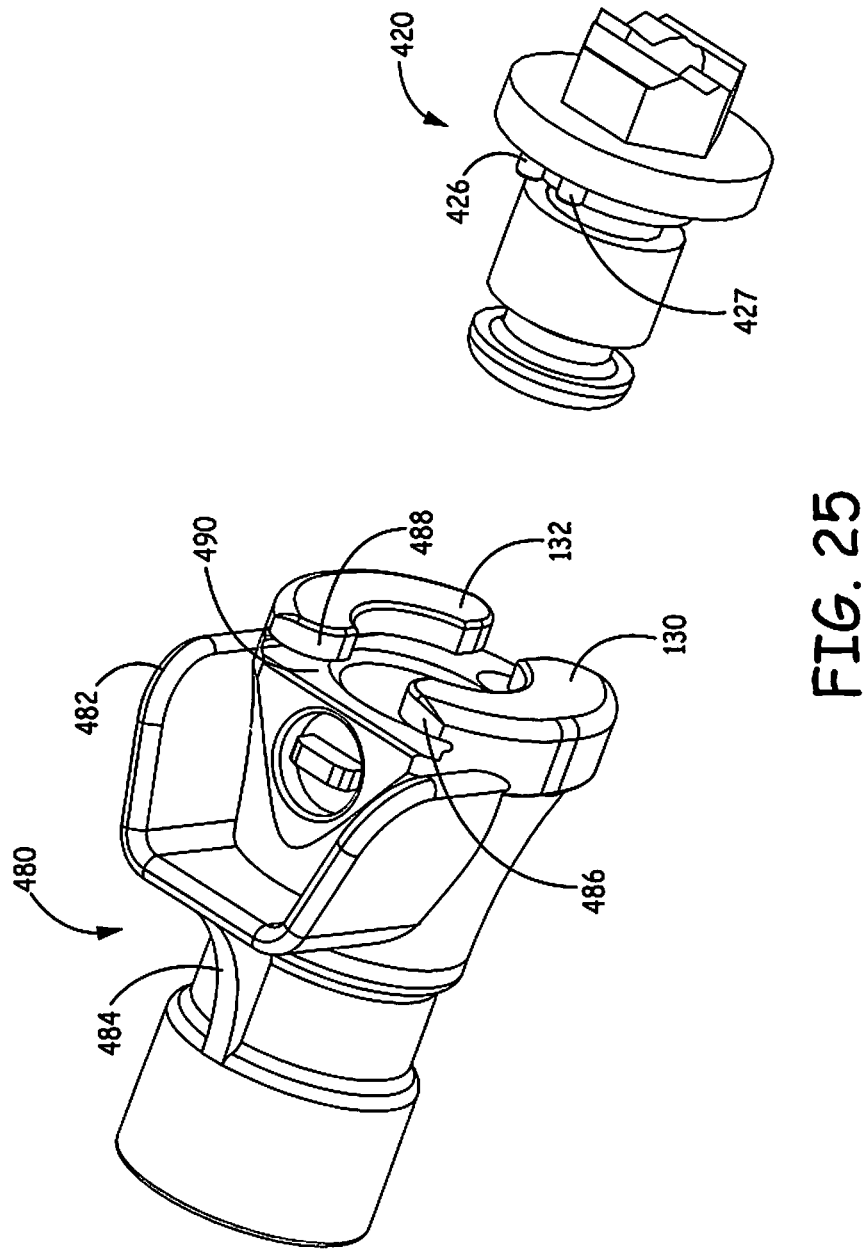
FIG. 25 is a perspective view of a female coupling of this invention aligned to be mated with a male coupling of this invention.

In FIG. 25, a female coupling 480 and the male coupling 420 are depicted, although any of the male couplings 410, 430, 440 would be suitable for the illustration as well. The female coupling 480 may be substantially similar, or identical, to the female coupling 100 of this invention, except for the presence of an optional shield 482 and rib 484. The shield 482 extends around the latch plate 106 when the latch plate 106 is present as disclosed and described previously. The rib 484 longitudinally supports the shield 482 and provides rigidity to the female coupling 480 when present. Upper contact surfaces 486, 488 may be present on the respective faces 130, 132. The tabs of this invention, namely 416, 426, 427, 436, 437, 448, 449, present on the male couplings as disclosed and described previously, may be dimensioned and positioned so as disposable between the contact surfaces 486, 488 of the coupling faces 130, 132 when the male couplings are attached to the fee male couplings of this invention.

The tabs of this invention, denoted previously, may be longitudinally dimensioned so that the tips of these tabs do not contact or abut a surface 490 present on the female coupler 100 or 480 and disposed between the contact surfaces 486, 488, thereby enabling a fluidly sealing connection between the attached male and female coupling of this invention. Accordingly, the tabs of this invention may be characterized as alignment structure, along with equivalent structural features known to the art and encompassed by this invention. As seen in FIG. 25, the position of the latch plate is determined by the position of the tab. Accordingly, rotating the tabs 426, 427 in the example of FIG. 25, also rotates the orientation of the latch plate when the male coupling 420 is coupled to the female coupling 480.

The tabs of this invention are illustrated as being generally rectangular, oval, or circular in cross-section. However, a person of ordinary skill in the art will recognize that other cross-sectional geometries may be suitable for other embodiments, such cross-sectional geometries being determined for esthetic reasons or suitability for manufacturing methods such as injection molding.

Figure 26:
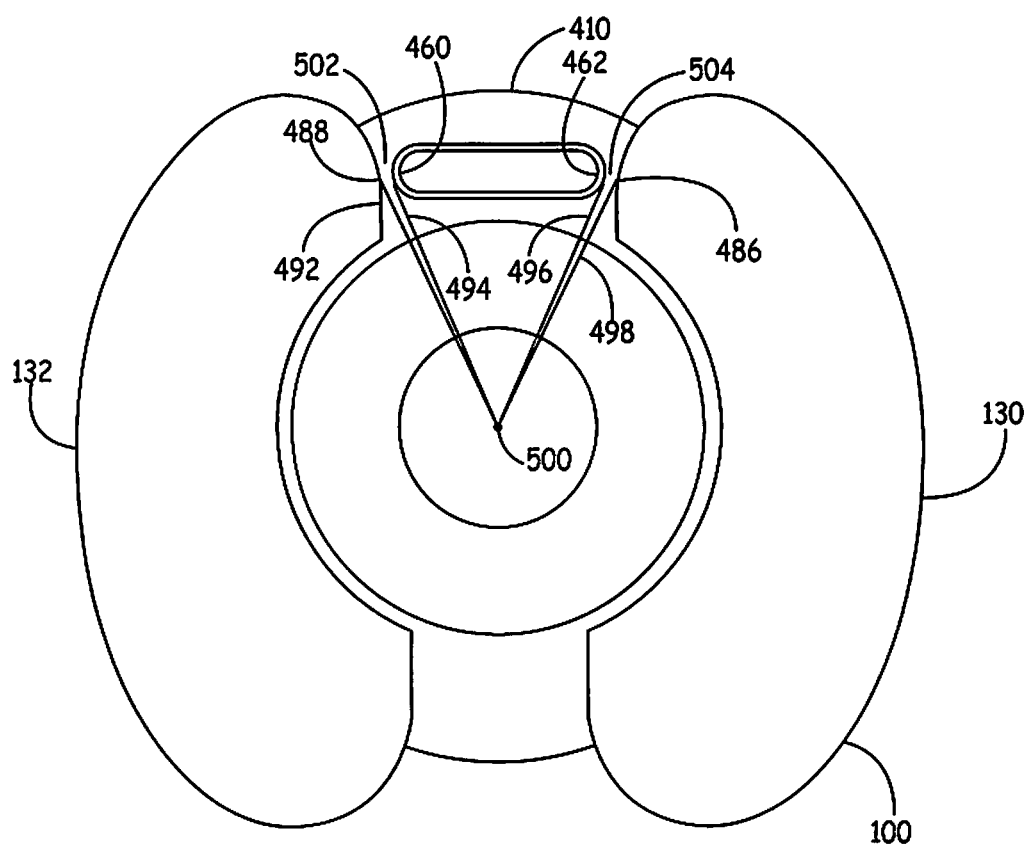
FIG. 26 is a cross-sectional view of the mated female and male couplings of FIG. 25.

FIG. 26 depicts a cross-section of mated female coupling 100 and male coupling 410, although any of the male couplings 420, 430, 440, could be substituted as well. In the embodiment depicted, the tab 416 is dimensioned and positioned such that a gap is present between the contact surfaces 460, 488 and between the contact surfaces 462, 486. To better illustrate suitable dimensions of these gaps, lines 492, 494, 496, 498 radially extend from a center 500. The gaps are then defined as the distance between the contact surface pairs 488, 460 and between the contact surface pairs 462, 486 as described by the arc between the respective lines 492, 494 and 496, 498 at the foregoing contact surface pairs. In certain embodiments, suitable gap dimensions or distances are between about 1 degree and 350 degrees, between about one degree and 270 degrees, between about 1 degree and 180 degrees, between about one degree and 90 degrees, between about one degree and 45 degrees, less than about 180 degrees, between about one degree and twenty degrees, between about one degree and ten degrees, any range subsumed therein, or about five degrees. In another embodiment, a suitable gap dimension or distance is sufficient to allow the male the male and female coupling to be mated, yet limit rotation to the extent desired. Some of the above-described embodiments may involve configuring the female coupling, for example removing some or all of the faces 130, 132 to allow the desired extent of rotation.

While not shown, equivalent aligning structure, as depicted and described herein, may be present proximate the location 490 present on the female coupling 100 or 480, such aligning structure being insertionally accommodated by a bore or opening present in the flange of the male coupling of this invention. Also not shown but recognizable by a person of ordinary skill in the art as equivalent aligning structure, would be a beveling or tapering from the base of the aligning structure of this invention, such that the aligning structure would have a maximum dimension proximate the flange and a minimum terminal dimension. For example, the tab 416 shown in FIG. 20 would have a base equivalent to that depicted and a terminus distal from the base with a lesser length. Such tapering would provide a gap to facilitate alignment when the male couplings were being mated but could enable the surfaces 460, 462 to contact the respective surfaces 488, 486 when a sealing mating has been accomplished. The contacting surface pairs 460, 488 and 462, 486 would serve to further maintain the radial positions of the male and female couplings in the presence of rotational or torsional forces, thereby maintaining the fluid-tight matings.

Because numerous modifications of this invention may be made without departing from the spirit thereof, the scope of the invention is not to be limited to the embodiments illustrated and described. Rather, the scope of the invention is to be determined by the appended claims and their equivalents.

What is claimed is:

1. A combination comprising:
   a female coupling assembly comprising:
      a female coupling body, a flange, an extension, a latch plate and a latch pin, said female coupling body defining a female coupling fluid pathway, said extension forming a pair of female coupling assembly faces and a slot, a female coupling contact surface present on each of said female coupling assembly faces,
      said latch plate reciprocating within said slot and biased in a locked position, and
      said latch pin inserted into a latch pin bore and securing said latch plate in said slot; and
   a male coupling assembly defining a male coupling fluid pathway and comprising:
      a male coupling connector,
      a flange in mechanical communication with said male coupling connector, a male coupler extending from said flange and defining an abutting surface,
      said male coupler accommodated by said female coupling body, and
      a non-rotational feature extending from an upper portion of said abutting surface and disposed above said male coupler, a pair of male coupling contact surfaces present on said non-rotational feature,
   said male coupling assembly mating to said female coupling assembly such that said female coupling fluid pathway is generally continuous with said male coupling fluid pathway, wherein said female coupling body accommodates said male coupler, wherein said non-rotational feature is disposed between said female coupling assembly faces such that an upper portion of each said female coupling contact surface is proximate one of said male coupling contact surfaces to thereby define an arc separating said female coupling contact surface and said male coupling contact surface and such that said male coupling assembly is rotationally limited with respect to said female coupling assembly.

2. The combination of claim 1, wherein said non-rotational feature axially extends from said flange.

3. The combination of claim 1, wherein said non-rotational feature comprises a tab.

4. The combination of claim 3, wherein said tab is generally circular in cross section.

5. The combination of claim 3, wherein said tab is generally oval in cross section.

6. The combination of claim 1, wherein each said arc is between about 1 degree and 45 degrees.

7. The combination of claim 1, wherein said non-rotational feature comprises a plurality of tabs.

8. The combination of claim 1, further comprising means for forming a fluid-tight seal when said male coupling assembly is mated to said female coupling.

9. The combination of claim 8, wherein said fluid-tight seal forming means comprises a terminal slot formed in said coupler and an O-ring disposed in said terminal slot.

10. The combination of claim 1, wherein said non-rotational feature defines a pair of lateral contact surfaces.

11. The combination of claim 1, wherein rotation is limited to between about 1 degree and 90 degrees.

12. The combination of claim 1, wherein rotation is limited to between about 1 degree and 45 degrees.

13. The combination of claim 1, wherein rotation is limited to between about 1 degree and 20 degrees.

14. A method of mating a male coupling to a female coupling,
   said male coupling defining a male coupling fluid pathway and a tab extending from a flange and disposed above a male coupler,
   said female coupling defining a female coupling fluid pathway and comprising a pair of radially opposed faces extending from a female coupling body and a latch mechanism to secure said male coupling to said female coupling when said male coupling and said female coupling are mated, said latch mechanism comprising a latch plate biased in a locked position and secured in said female coupling by a latch pin, said latch plate reciprocating in a slot disposed in said female coupling,
   said method comprising mating said male coupling and said female coupling such that said male coupling fluid pathway aligns with said female coupling fluid pathway and such that said tab is disposed between said radially opposed faces to limit rotation of said male coupling with respect to said female coupling and such that said latch plate is reciprocated to said locked position, thereby securing said male coupling to said female coupling.

15. The method of claim 14, wherein rotation is limited to between about 1 degree and 90 degrees.

16. The method of claim 15, wherein rotation is limited to between about 1 degree and 20 degrees.

17. The method of claim 14, wherein rotation is limited to between about 1 degree and 45 degrees.

18. A method of manufacturing a combination, comprising
   forming a female coupling assembly having a female coupling body, a flange, an extension, a latch plate and a latch pin, said female coupling body defining a female coupling fluid pathway, said extension forming a pair of female coupling assembly faces and a slot, a female coupling contact surface present on each of said female coupling assembly faces, said latch plate reciprocating within said slot and biased in a locked position, and said latch pin inserted into a latch pin bore and securing said latch plate in said slot; and
   forming a male coupling assembly having a male coupling connector, a flange in mechanical communication with said male coupling connector, a male coupler extending from said flange and defining an abutting surface, said male coupler accommodated by said female coupling body, and a non-rotational feature extending from an upper portion of said abutting surface and disposed above said male coupler, a pair of male coupling contact surfaces present on said non-rotational feature, such that said male coupling assembly mates to said female coupling assembly such that said female coupling fluid pathway is generally continuous with said male coupling fluid pathway, wherein said female coupling body accommodates said male coupler, wherein said non-rotational feature is disposed between said female coupling assembly faces such that an upper portion of each said female coupling contact surface is proximate one of said male coupling contact surfaces to thereby define an arc separating said female coupling contact surface and said male coupling contact surface and such that said male coupling assembly is rotationally limited with respect to said female coupling assembly.

19. The method of claim 18, wherein said formed non-rotational feature comprises a tab, said tab generally circular in cross section.

20. The method of claim 18, wherein said formed non-rotational feature comprises a tab, said tab generally oval in cross section.

\* \* \* \* \*